(12) United States Patent
Marko et al.

(10) Patent No.: US 6,347,989 B1
(45) Date of Patent: Feb. 19, 2002

(54) AIR INTAKE MANIFOLD FOR A VEHICLE VENTILATION SYSTEM

(75) Inventors: Kenneth M. Marko, Corinth; Michael B. Montgomery, Sanger, both of TX (US); Rob A. Cook, Conrad, MT (US)

(73) Assignee: Paccar Inc, Bellevue, WA (US)

(*) Notice: Subject to any disclaimer, the term of this patent is extended or adjusted under 35 U.S.C. 154(b) by 0 days.

(21) Appl. No.: 09/494,085

(22) Filed: Jan. 28, 2000

(51) Int. Cl.$^7$ ................................................ B60H 1/28
(52) U.S. Cl. ........................ 454/147; 454/82; 454/111
(58) Field of Search .......................... 454/82, 84, 111, 454/138, 147, 146, 151

(56) References Cited

U.S. PATENT DOCUMENTS

| | | | | |
|---|---|---|---|---|
| 4,819,550 A | * | 4/1989 | Ioka | 454/147 |
| 4,953,449 A | * | 9/1990 | Jackson | 454/138 |
| 5,139,458 A | * | 8/1992 | Koukal et al. | 454/147 |
| 5,145,457 A | * | 9/1992 | Tanigaito et al. | 454/147 |
| 5,277,656 A | * | 1/1994 | Koukal et al. | 454/147 |
| 5,679,074 A | * | 10/1997 | Siegel | 454/147 |

FOREIGN PATENT DOCUMENTS

JP   60-124517   *  7/1985 ................ 454/146

\* cited by examiner

*Primary Examiner*—Harold Joyce
(74) *Attorney, Agent, or Firm*—Sidley Austin Brown & Wood

(57) ABSTRACT

An air intake manifold for providing air from an exterior of a vehicle to a ventilation system of the vehicle. A primary plenum chamber has an intake passageway formed therein. The intake passageway is adapted to allow air from the exterior of the vehicle to enter the primary plenum chamber. A secondary plenum chamber is located within the primary plenum chamber. A shield is attached to the primary plenum chamber and extends over the secondary plenum chamber. A secondary inlet passageway is formed in an upper portion of the secondary plenum chamber. The secondary inlet passageway fluidly connects the primary plenum chamber to the secondary plenum chamber. A filter member covers the secondary inlet passageway to prevent debris from entering the secondary plenum chamber via the secondary inlet passageway. An outlet passageway is formed in the secondary plenum chamber. The outlet passageway fluidly connects the secondary plenum chamber to the ventilation system. A primary drain passageway is formed in a lower portion of the primary plenum chamber. A secondary drain passageway is formed in a lower portion of the secondary plenum chamber to fluidly connect the secondary plenum chamber to the primary plenum chamber.

25 Claims, 5 Drawing Sheets

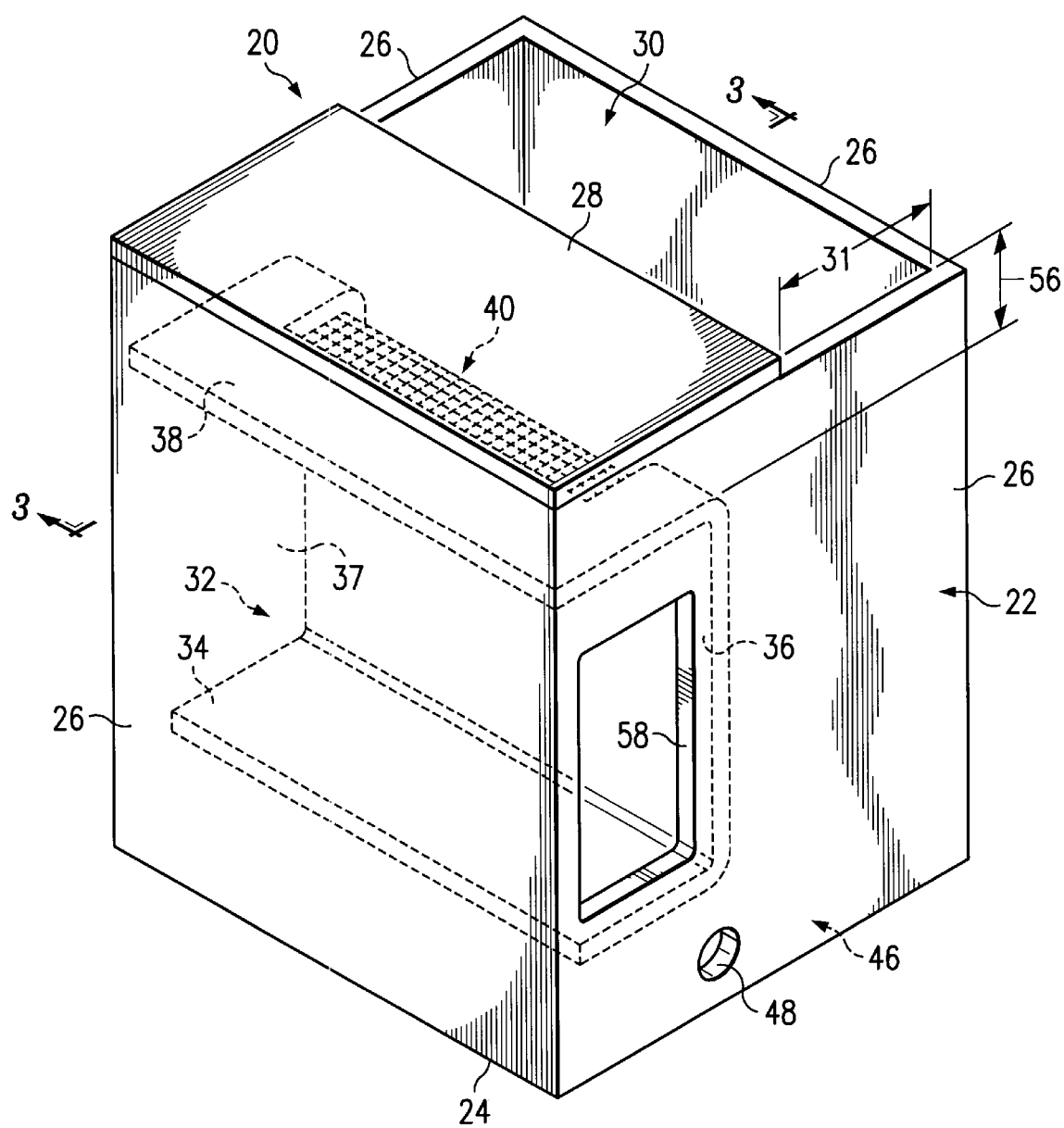

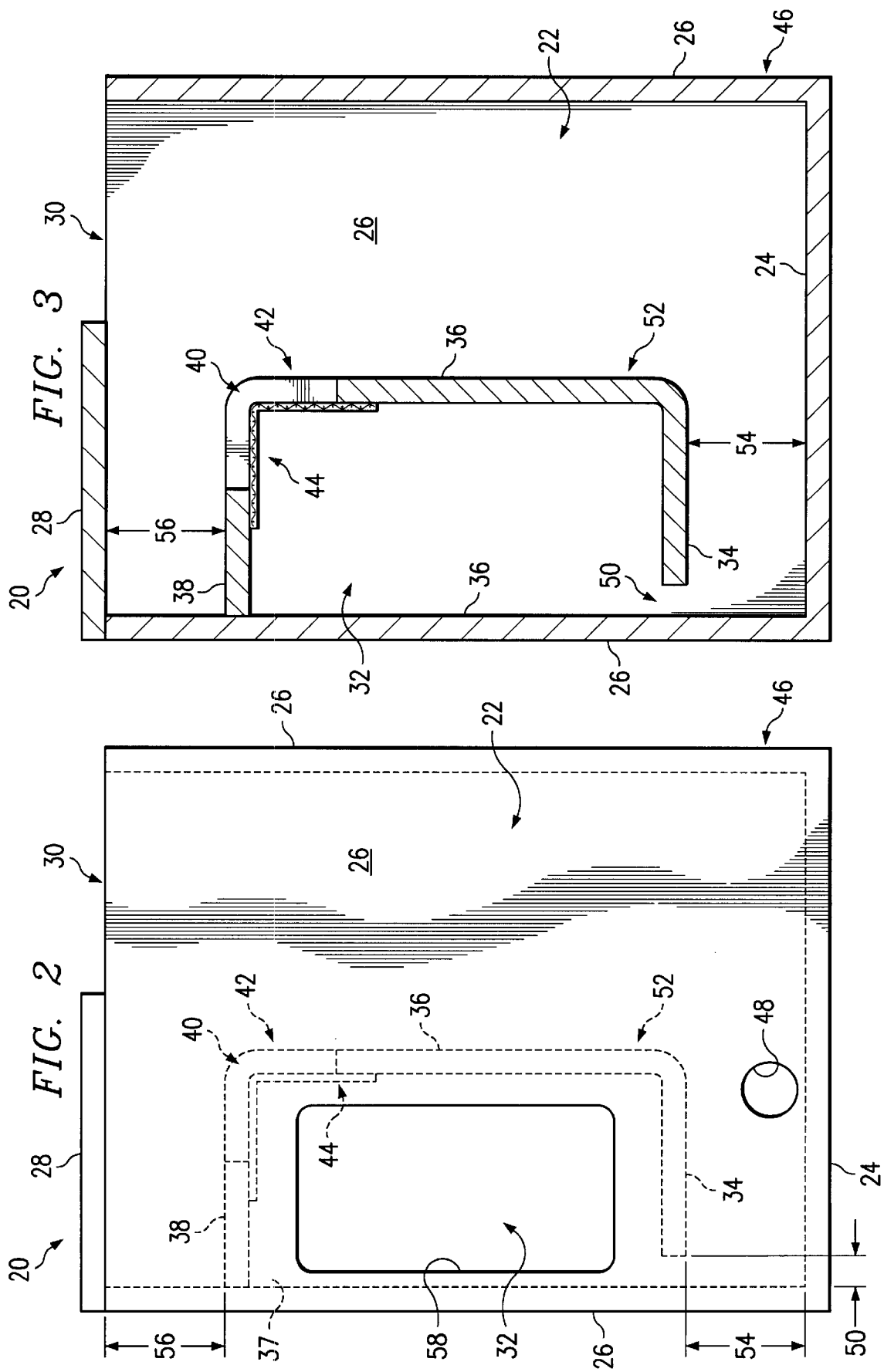

AIR INTAKE MANIFOLD FOR A VEHICLE VENTILATION SYSTEM

TECHNICAL FIELD OF THE INVENTION

The present invention relates to an air intake manifold for a vehicle ventilation system. In one aspect, it relates to an air intake manifold having a secondary plenum chamber positioned within a primary plenum chamber.

BACKGROUND OF THE INVENTION

It is known to provide an air intake manifold for the ventilation system of a vehicle in order to control the location and source of ventilation air, for example to avoid drawing in exhaust fumes or air from the engine compartment. Typically, such a ventilation intake manifold is positioned to draw in fresh exterior air. However, such exterior air which may contain environmental water (e.g., rain, ice, snow) or debris (e.g., leaves, evergreen needles, grit). Such water and/or debris can damage components within the ventilation system or restrict the flow of air if they are allowed pass through the ventilation intake manifold into the ventilation system.

A common location for placement of ventilation intake manifolds is at the rear of a vehicle's cowling just below the front windshield. It is also common to place closely spaced bars or a screen across the manifold inlet to prevent larger debris from entering. However, known ventilation intake manifolds have disadvantages in their design. For example, the air inlet of some manifolds can be blocked by a thin layer of leaves, snow, or other debris collecting on the inlet screen. In other ventilation intake manifolds, water from rain or melted snow or ice can pass through the ventilation manifold and enter the ventilation system. In still other manifolds, smaller debris which enter the ventilation manifold cannot be conveniently extracted, allowing them to accumulate over time until the air flow is blocked.

A need therefore exists, for a ventilation intake manifold having an inlet which is not easily clogged by environmental debris but which prevents such debris from entering the ventilation system. A need further exists, for a ventilation intake manifold which separates water in the inlet air so that it does not enter the ventilation system. Still further, a need exists for a ventilation air intake manifold which allows the collected debris to be manually extracted from the manifold without requiring disassembly of the manifold.

SUMMARY OF THE INVENTION

It is an object of the present invention to provide an air intake manifold for a vehicle ventilation system that can hinder debris and water from entering the ventilation system without significantly restricting the air flow.

It is another object of the present invention to provide an air intake manifold which separates water in the inlet air so it does not enter the ventilation system.

It is yet another object of the present invention to provide an air intake manifold which allows collected debris to be manually extracted from the manifold without requiring disassembly of the manifold.

In accordance with one aspect of the present invention, an air intake manifold for a vehicle ventilation system is provided to prevent debris and fluids from entering the vehicle ventilation system along with the ventilation intake air. The air intake manifold comprises a primary plenum chamber and a secondary plenum chamber. The primary plenum chamber has an intake passageway formed therein. The intake passageway is adapted to allow air from the exterior of the vehicle to enter the primary plenum chamber. The secondary plenum chamber is located within the primary plenum chamber and is fluidly connected to the primary plenum chamber. The secondary plenum chamber is adapted to receive air from the primary plenum chamber. An outlet passageway is formed in the secondary plenum chamber. The outlet passageway fluidly connects the secondary plenum chamber to the primary plenum chamber. Hence, the ventilation intake air travels from the exterior of the vehicle into the primary plenum chamber, then into the secondary plenum chamber, then into the ventilation system.

In accordance with another aspect of the present invention, an air intake manifold for a vehicle ventilation system comprises a primary plenum chamber and a secondary plenum chamber. The primary plenum chamber has an intake passageway formed therein. The intake passageway is adapted to allow air from the exterior of the vehicle to enter the primary plenum chamber. The secondary plenum chamber has a first and second passageway formed therein. The first passageway fluidly connects the primary plenum chamber to the secondary plenum chamber. A filter member covers the first passageway to prevent objects of at least a predetermined size from entering the secondary plenum chamber via the first passageway. The second passageway is formed in the lower portion of the secondary plenum chamber and it also fluidly connects the primary plenum chamber to the secondary plenum chamber. One purpose of the second passageway is to allow fluids and objects that have passed through the filter member to drain from the secondary plenum chamber. An outlet passageway is formed in the secondary plenum chamber. The outlet passageway fluidly connects the secondary plenum chamber to the ventilation system. Thus, the ventilation intake air can travel from the exterior of the vehicle to the primary plenum chamber, then to the secondary plenum chamber, then to the ventilation system. In accordance with another embodiment of the present invention, the secondary plenum chamber may be located within the primary plenum chamber.

In accordance with yet another aspect of the present invention, an air intake manifold for a vehicle ventilation system comprises a primary plenum chamber and a secondary plenum chamber located within the primary plenum chamber. The primary plenum chamber has a bottom, lateral walls, and a shield. The shield is at least a partial top for the primary plenum chamber. An intake passageway is formed at the upper portion of the primary plenum chamber in either the top, a lateral side, or both. The secondary plenum chamber has a bottom, lateral walls, and a top. In one embodiment, the primary and secondary plenum chambers may share at least one common lateral wall. A secondary inlet passageway is formed in an upper portion of the secondary plenum chamber in either the top, a lateral side, or both. The secondary inlet passageway fluidly connects the primary and secondary plenum chambers. A filter member covers the secondary inlet passageway to prevent objects larger than openings in the filter member from entering the secondary plenum chamber via said secondary inlet passageway. A primary drain passageway is formed in the lower portion of the primary plenum chamber to allow fluids and objects smaller than the primary drain passageway to exit the primary plenum chamber. A secondary drain passageway is formed in a lower portion of the secondary plenum chamber in either the bottom, a lateral side, or both. One purpose of the secondary drain passageway is to allow fluids and objects that have passed through the filter member to drain from the secondary plenum chamber. The bottom of the secondary plenum chamber is separated from the bottom of the primary plenum chamber by a first spaced distance. The first spaced distance provides a buffer zone for when fluids accumulate in the lower portion of the primary plenum chamber to prevent them from entering the secondary plenum chamber via the secondary drain passageway. An outlet passageway is formed in the secondary plenum chamber to fluidly connect the secondary plenum chamber to the ventilation system. In another embodiment, the secondary inlet passageway may be formed in the top of the secondary passageway and the shield may be separated from the top of the secondary plenum chamber by a second spaced distance. This second spaced distance allows air within the primary plenum chamber to flow into the secondary inlet passageway.

BRIEF DESCRIPTION OF THE DRAWINGS

Other objects and advantages of the invention will become apparent upon reading the following detailed description and upon reference to the accompanying drawings in which:

FIG. 1 is an isometric view of an air intake manifold according to a first embodiment of the present invention;

FIG. 2 is a side view of the air intake manifold of FIG. 1;

FIG. 3 is side cross-sectional view of the air intake manifold taken along line 3—3 of FIG. 1;

DETAILED DESCRIPTION OF THE INVENTION

Figure 4:
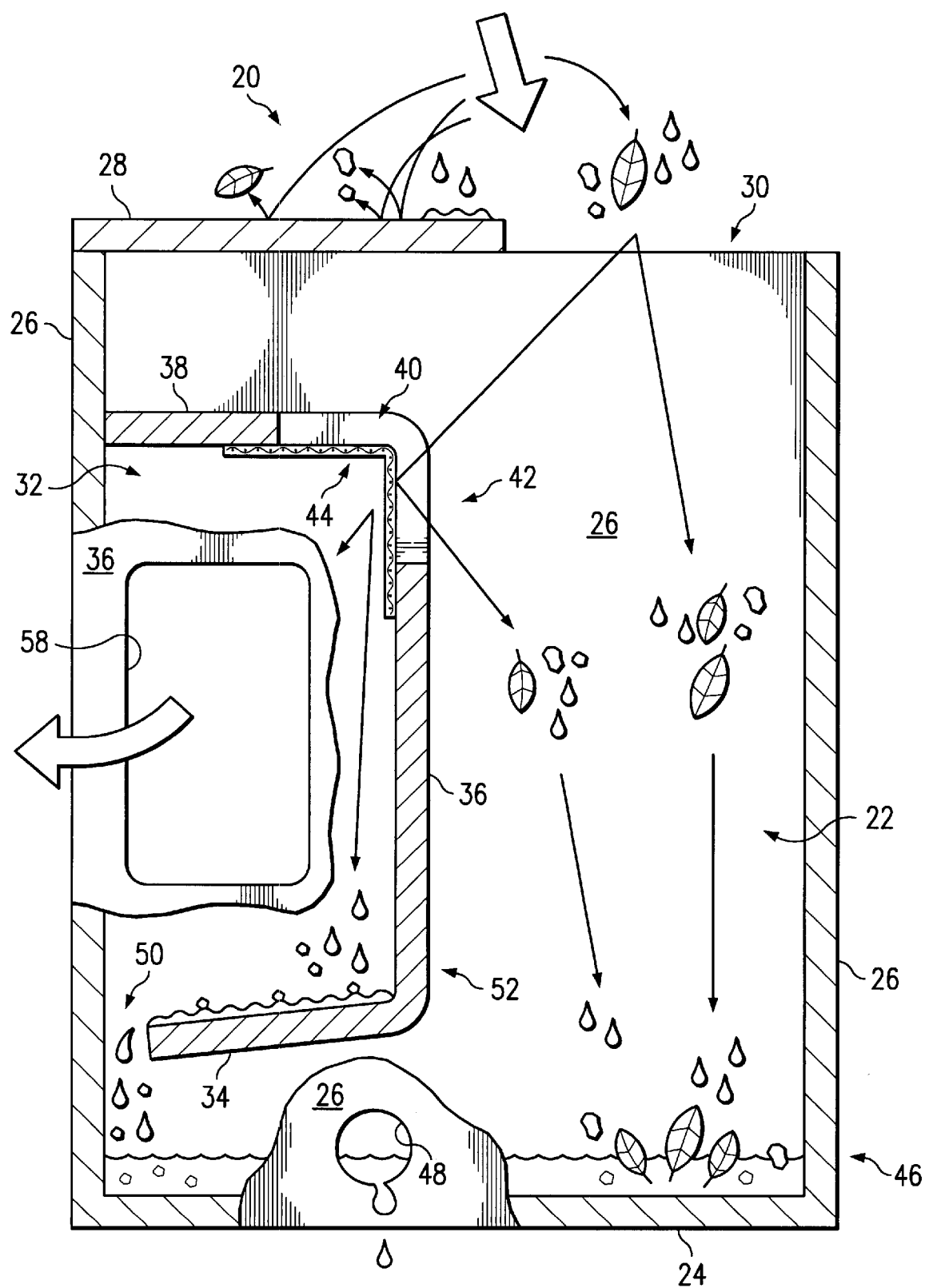
FIG. 4 is a side view of the air intake manifold of FIG. 1 with portions broken away to illustrate the flow of air and debris within the manifold.

Referring now to the drawings, wherein like reference numbers are used to designate like elements throughout the various views, several embodiments, as well as other possible modifications, are further described.

FIGS. 1–4 show various views of a ventilation air intake manifold 20 for a vehicle according to a first embodiment of the present invention. The air intake manifold 20 has a primary plenum chamber 22 defined by a bottom 24, lateral walls 26, and a shield 28. The shield 28 forms a partial top for the primary plenum chamber 22, and the remainder of the primary plenum chamber top is open to form a manifold inlet passageway 30. The manifold inlet passageway 30 allows air from the exterior of a vehicle (not shown) to enter the primary plenum chamber 22.

The shield 28 may be attached directly to one or more of the lateral walls 26 of the primary plenum chamber as shown in FIGS. 1–4, however this is not required. It is only necessary that the shield 28 be positioned vertically over a portion of the primary plenum chamber 22.

The width (denoted by reference number 31) of the manifold inlet passageway 30 is selected to be wide enough such that leaves or snow will not readily accumulate on top and block the inlet. Instead, debris and leaves will fall through the inlet passageway 30 into the primary plenum chamber 22. The width 31 of the manifold inlet passageway 30 may be selected to allow a person's hand to be inserted into the manifold in order to remove accumulated debris without requiring disassembly of the manifold. in order to remove accumulated debris without requiring disassembly of the manifold.

A secondary plenum chamber 32 is located within the primary plenum chamber 22. The secondary plenum chamber 32 is generally defined by a bottom 34, lateral walls 36, 37 and a top 38. The lateral walls of the secondary plenum chamber 32 may be discrete structures or they may constitute portions of the lateral walls of the primary chamber 22. For example, in the embodiment shown in FIGS. 1–4, the lateral wall 36 at the rear of the secondary plenum chamber 22 is a discrete structure, while the lateral walls 37 at the front and sides of the secondary plenum chamber constitute portions of the lateral walls 26 of the primary plenum chamber 22.

A secondary inlet passageway 40 is formed in an upper portion 42 of the secondary plenum chamber 32. The secondary inlet passageway 40 fluidly connects the primary plenum chamber 22 to the secondary plenum chamber 32. Hence, the air inside the primary plenum chamber 22 can flow into the secondary plenum chamber 32 via the secondary inlet passageway 40. The secondary inlet passageway 40 in the first embodiment is formed through a portion of the top 38 and one rear lateral side 36 of the secondary plenum chamber 32 where the lateral wall and the top intersect one another. Alternatively, the secondary inlet passageway 40 could be formed in only the top 38 or in only an interior lateral wall 36 of the secondary plenum. A filter member 44, which is a screen in this case, covers the secondary inlet passageway 40. The screen 44 is adapted to prevent debris and other objects larger than the screen openings from entering the secondary plenum chamber 32 via the secondary inlet passageway 40. Thus, as shown in FIG. 4, debris that enter the primary plenum chamber 22 that are larger than the screen openings will be blocked from entering the secondary plenum chamber 32 via the secondary inlet passageway 40. Such blocked debris will then fall into the lower portion 46 of the primary plenum chamber 22 due to gravity.

A primary drain passageway 48 is formed in a lateral wall 26 at the lower portion 46 of the primary plenum chamber 22. Although, the primary drain passageway 48 could also be formed in the bottom 24 of the primary plenum chamber 22. The primary drain passageway 48 is adapted to allow liquids and objects smaller than an opening of the primary drain passageway to pass from inside the primary plenum chamber 22 to the exterior of the primary plenum chamber.

A secondary drain passageway 50 is located at a lower portion 52 of the secondary plenum chamber 32 and it fluidly connects the secondary plenum chamber to the primary plenum chamber 22. The secondary drain passageway 50 is formed by a gap between the secondary plenum chamber bottom 34 and a lateral wall 26 of the primary plenum chamber 22. As shown in FIG. 4, the secondary drain passageway 50 allows liquid and objects that were not blocked by the screen 44 to drain or fall out of the lower portion 52 of the secondary plenum chamber 32. The primary purpose of the secondary drain passageway 50 is to prevent the accumulation of liquid and objects within the secondary plenum chamber 32. Alternatively, the secondary drain passageway 50 could be a hole anywhere at the lower portion 52 of the secondary plenum chamber 32 while still serving the same primary purpose.

As best shown in FIG. 3, the bottom 34 of the secondary plenum chamber 32 is separated from the bottom 24 of the primary plenum chamber 22 by a first spaced distance 54 at the lower portion 46 of the primary plenum chamber. The first spaced distance 54 provides a buffer space for liquids and objects that make their way to the lower portion 46 of the primary plenum chamber 22. At least a portion of the primary drain passageway 48 is lower than the bottom 34 of the secondary plenum chamber 32 and the secondary drain passageway 50. Hence, if liquid accumulates in the lower portion 46 of the primary plenum chamber 22 faster than it can drain out of the primary drain passageway 48, this buffer space at the lower portion of the primary plenum chamber provided by the first spaced distance 54 may prevent the liquid from entering the secondary plenum chamber 32 via the secondary drain passageway 50.

As best seen in FIG. 3, the top 38 of the secondary plenum chamber 32 is separated from the shield 28 of the primary plenum chamber 22 by a second spaced distance 56. The second spaced distance 56 allows air inside the primary plenum chamber 22 to flow to the top 38 of the secondary plenum chamber 32, and hence to the portion of the secondary inlet passageway 40 located on the top of the secondary plenum chamber. The shield 28 extends over the top 38 of the secondary plenum chamber 32 and thus over the secondary inlet passageway 40. As shown in FIG. 4, the shield 28 deflects most debris and water from hitting the screen 44 covering the secondary inlet passageway 40. In addition, the shield 28 prevents some debris and water from entering the primary plenum chamber 22.

An outlet passageway 58 is formed in a lateral wall 36 of the secondary plenum chamber 32, which in this case is a common lateral wall shared by the primary and secondary plenum chambers 22, 32. The outlet passageway 58 fluidly connects the second plenum chamber 32 to the ventilation system (not shown). Thus, the air that enters the ventilation system via the outlet passageway 58 comes from the secondary plenum chamber 32, and the air that enters the secondary plenum chamber comes from the primary plenum chamber 22. In other words, the intake air for the ventilation system travels from the exterior of the vehicle to the primary plenum chamber 22 via the intake passageway 30, then to the secondary plenum chamber 32, then to the ventilation system via the outlet passageway 58. The result is that the features of the air intake manifold prevent most of the debris and water from entering the ventilation system.

Figure 5:
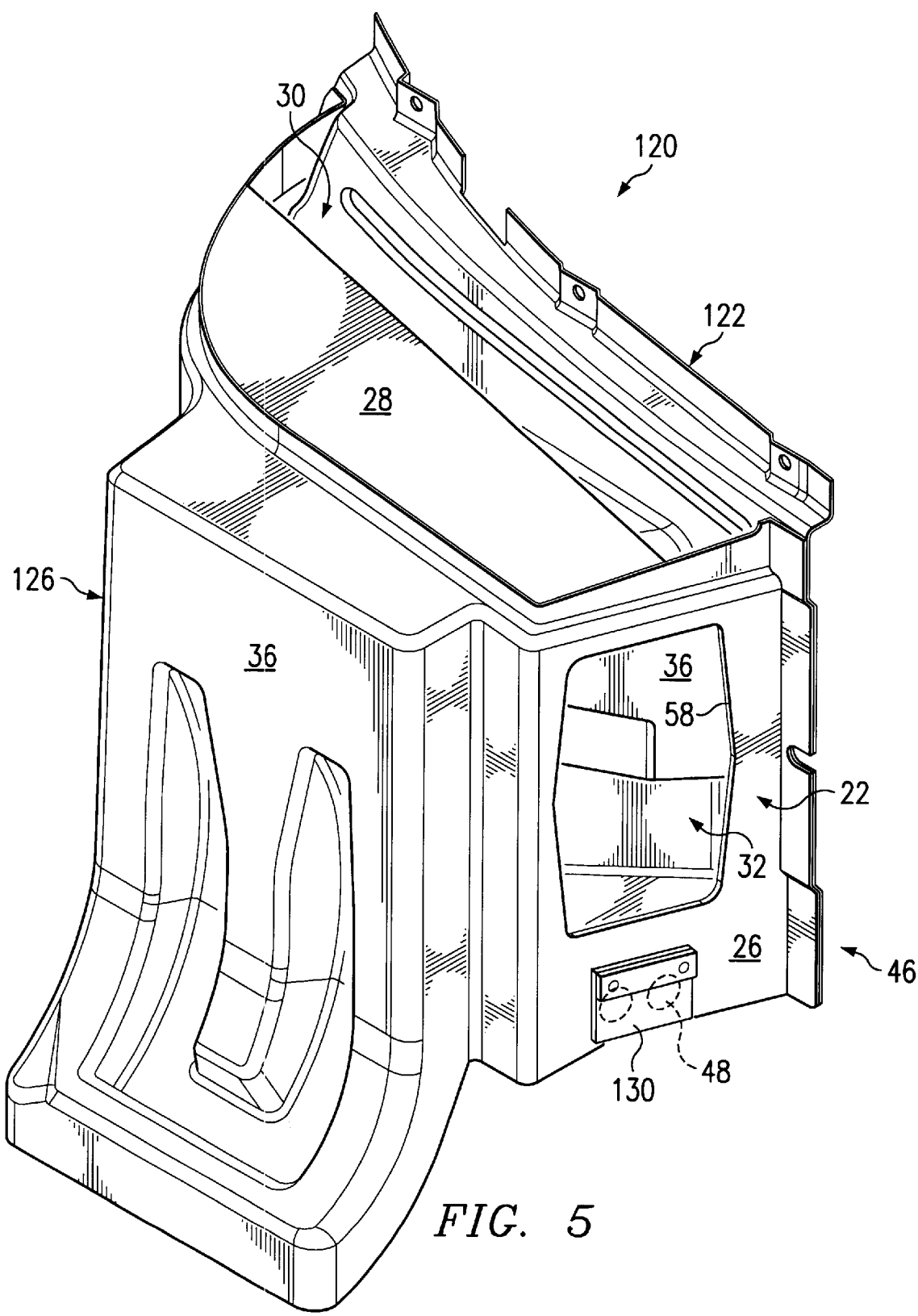
FIG. 5 is an isometric view of an air intake manifold according to a second embodiment of the present invention.
Figure 6:
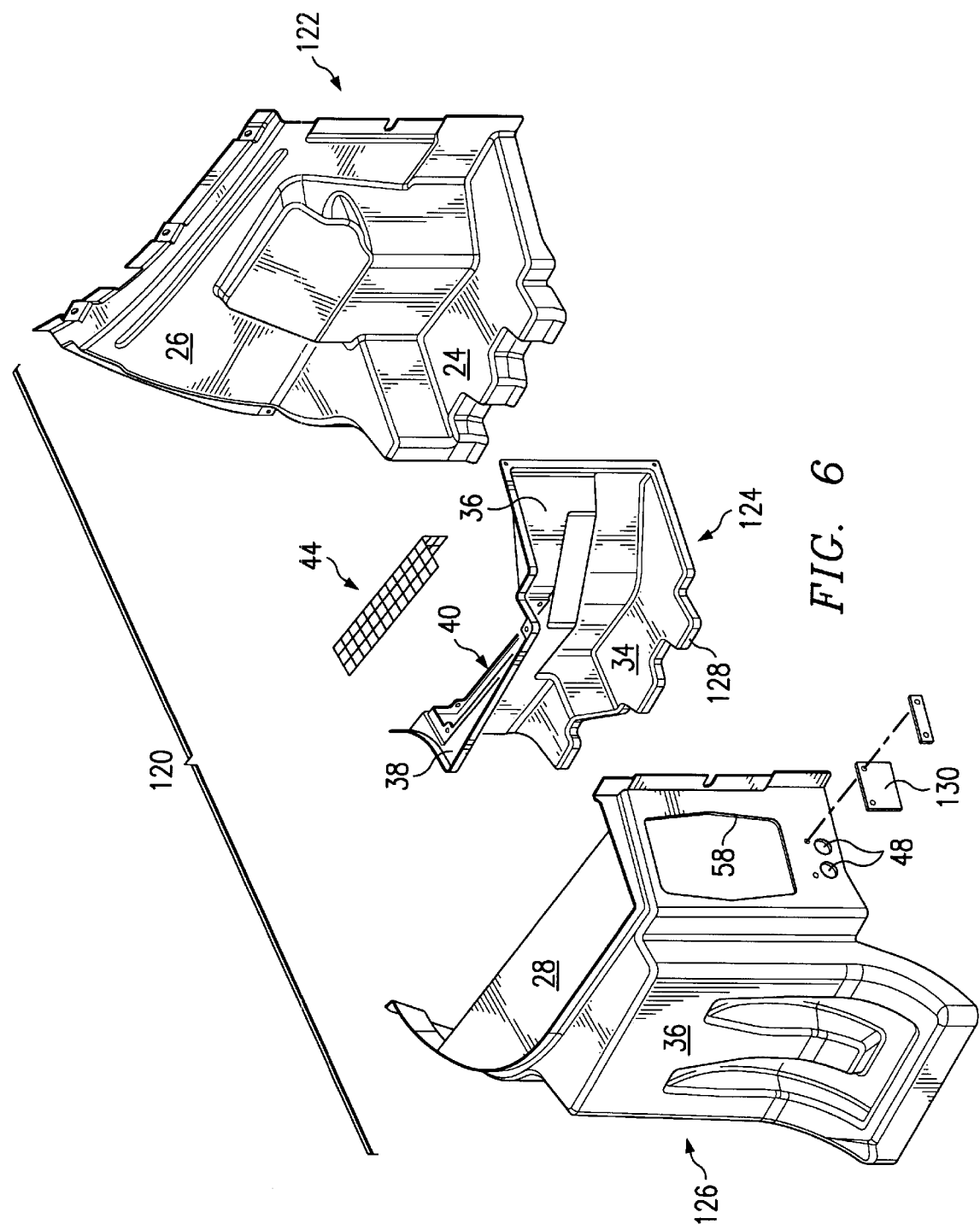
FIG. 6 is a reduced, exploded view of the air intake manifold of FIG. 5.

FIGS. 5–6 show an air intake manifold 120 for a vehicle according to a second embodiment of the present invention. The air intake manifold 120 has the same components and general layout as the first embodiment, except that it is shaped different. The second embodiment is shaped to conform to other components on the vehicle (not shown). As best seen in FIG. 6, the second embodiment has three main pieces that are joined together to form the primary and secondary plenum chambers 22, 32: a back piece 122, an intermediate piece 124, and a front piece 126. The back piece 122 and the front piece 126 form the primary plenum chamber 22 when joined together. The intermediate piece 124 and the front piece 126 form the secondary plenum chamber 32 when joined together. As in the first embodiment, the secondary plenum chamber 32 is located within the primary plenum chamber 22 in the second embodiment also. The secondary drain passageway 50 is formed by a gap between the front edge 128 of the intermediate piece 124 and the front piece 126 when the pieces are joined together. The three pieces may be joined together by any of the commonly known ways of joining parts together, including but not limited to: rivets, bolts, screws, adhesive bonding, thermal bonding, and welding. Therefore, an air intake manifold of the present invention can have various shapes and sizes for a given application.

Also, the primary drain passageway 48 of the second embodiment has a flap 130 covering it. The flap 130 is attached to a lateral wall 26 on the outside of the primary plenum chamber 22. The flap 130 acts as a one way valve to hinder objects and liquids from entering the primary plenum chamber 22, but still allowing objects smaller than the primary drain passageway 48 and liquids to exit the primary plenum chamber 22.

Other possible embodiments of the present invention may have other variations. For example, the shield 28 may extend across the entire top of the primary plenum chamber 22 with the intake passageway 30 being formed in a lateral wall 26 of the primary plenum chamber. If there is no second spaced distance 56 between the top 38 of the secondary plenum chamber 32 and the shield 28, then the shield may be the top for the secondary plenum chamber. Similarly, if there is no first spaced distance 54 between the bottom 34 of the secondary plenum chamber 32 and the bottom 24 of the primary plenum chamber 22, then the bottom of the secondary plenum chamber may be a common wall shared with the bottom of the primary plenum chamber.

The secondary plenum chamber 32 may not be within the primary plenum chamber 22 or it may be only partially within the primary plenum chamber. Also, the secondary plenum chamber 32 may not share any lateral walls 36 with the primary plenum chamber 22. The secondary inlet passageway 40 may be in the top 38 only, in one lateral wall 36 only, in several lateral walls, or in the top and at least one lateral wall of the secondary plenum chamber 32. It is preferred to have the secondary inlet passageway 40 in an upper portion 42 of the secondary plenum chamber 32 above the secondary drain passageway 50. In addition, there may be multiple secondary inlet passageways 40 covered with filter members 44. The size of the openings in the filter member 44 can vary for different applications to filter different sizes of objects. Furthermore, the filter member 44 can be made from various materials, including but not limited to: metal, cloth, synthetic fibers, or some combination thereof.

The primary drain passageway 48 may be formed in a lateral wall 26 only, in the bottom 24 only, in several lateral walls, or in the bottom and at least one lateral wall of the primary plenum chamber 22. There may also be multiple primary drain passageways 48. Similarly, the secondary drain passageway 50 may be formed in a lateral wall 36 only, in the bottom 34 only, in several lateral walls, or in the bottom and at least one lateral wall of the secondary plenum chamber 32. Also, there may be multiple secondary drain passageways 50.

The bottom 34 of the plenum chamber 32 may be sloped to aid in drainage. Likewise, the bottom 24 of the primary plenum chamber 22 also may be sloped to aid in drainage. The top 38 of the secondary plenum chamber 32 may be sloped to prevent liquids and objects from accumulating on top of the secondary plenum chamber.

It will be appreciated by those skilled in the art having the benefit of this disclosure that this invention provides an air intake manifold for a vehicle ventilation system. It should be understood that the drawings and detailed description herein are to be regarded in an illustrative rather than a restrictive sense, and are not intended to limit the invention to the particular forms disclosed. On the contrary, the invention includes any further modifications, changes, rearrangements, substitutions, alternatives, design choices, and embodiments apparent to those of ordinary skill in the art without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. An air intake manifold for providing air from an exterior of a vehicle to a ventilation system of said vehicle, comprising:

a primary plenum chamber having an intake passageway formed therein, said intake passageway being adapted to allow air from said exterior of said vehicle to enter said primary plenum chamber;

a secondary plenum chamber fluidly connected to said primary plenum chamber, said secondary plenum chamber being located within said primary plenum chamber and said secondary plenum chamber being adapted to receive said air from said primary plenum chamber; and an outlet passageway formed in said secondary plenum chamber, said outlet passageway fluidly connecting said secondary plenum chamber to said ventilation system such that said air can travel from said exterior of said vehicle to said primary plenum chamber to said secondary plenum chamber to said ventilation system, wherein a bottom of said secondary plenum chamber is separated from a bottom of said primary plenum chamber by a first spaced distance.

2. An air intake manifold in accordance with claim 1, further comprising:

a primary drain passageway formed in a lower portion of said primary plenum chamber, at least a portion of said primary drain passageway being lower than said bottom of said secondary plenum chamber.

3. An air intake manifold in accordance with claim 2, further comprising:

a flap attached to the exterior of said primary plenum chamber and covering said primary drain passageway.

4. An air intake manifold in accordance with claim 1, further comprising:

a secondary drain passageway formed between said secondary plenum chamber and said primary plenum chamber, said secondary drain passageway being located at a lower portion of said secondary plenum chamber.

5. An air intake manifold in accordance with claim 1, further comprising:

a secondary inlet passageway formed in an upper portion of said secondary plenum chamber where said secondary plenum chamber is fluidly connected to said primary plenum chamber.

6. An air intake manifold in accordance with claim 5, further comprising:

a filter member covering said secondary inlet passageway, said filter member being adapted to hinder passage of debris into said secondary plenum chamber.

7. An air intake manifold in accordance with claim 6, wherein said filter member is a screen.

8. An air intake manifold in accordance with claim 5, further comprising:

a shield extending over at least a portion of said secondary inlet passageway, said shield being separated from said secondary inlet passageway by a second spaced distance.

9. An air intake manifold for providing air from an exterior of a vehicle to a ventilation system of said vehicle, comprising:

a primary plenum chamber having an intake passageway formed therein, said intake passageway being adapted to allow air from said exterior of said vehicle to enter said primary plenum chamber;

a secondary plenum chamber;

a first passageway formed in said secondary plenum chamber, said first passageway fluidly connecting said primary plenum chamber to said secondary plenum chamber;

a filter member covering said first passageway, said filter member being adapted to prevent objects of at least a predetermined size from entering said secondary plenum chamber via said first passageway;

a second passageway formed in a lower portion of said secondary plenum chamber, said second passageway fluidly connecting said primary plenum chamber to said secondary plenum chamber; and an outlet passageway formed in said secondary plenum chamber, said outlet passageway fluidly connecting said secondary plenum chamber to said ventilation system such that said air can travel from said exterior of said vehicle to said primary plenum chamber to said secondary plenum chamber to said ventilation system, wherein said secondary plenum chamber is located within said primary plenum chamber.

10. An air intake manifold in accordance with claim 9, wherein a bottom of said secondary plenum chamber is separated from a bottom of said primary plenum chamber by a first spaced distance.

11. An air intake manifold in accordance with claim 10, further comprising:

a primary drain passageway formed in a lower portion of said primary plenum chamber, at least a portion of said primary drain passageway being lower than said bottom of said secondary plenum chamber.

12. An air intake manifold in accordance with claim 11, further comprising:

a flap attached to the exterior of said primary plenum chamber and covering said primary drain passageway.

13. An air intake manifold in accordance with claim 9, further comprising:

a shield extending over at least a portion of said first passageway, said shield being separated from said first passageway by a second spaced distance.

14. An air intake manifold in accordance with claim 9, wherein said filter member is a screen.

15. An air intake manifold for providing air from an exterior of a vehicle to a ventilation system of said vehicle, comprising:

a primary plenum chamber having a bottom, lateral walls, and a shield, said shield being located at an upper portion of said primary plenum chamber and said shield forming at least a partial top for said primary plenum chamber;

an intake passageway formed in said upper portion of said primary plenum, said intake passageway being adapted to allow air from said exterior of said vehicle to enter said primary plenum chamber;

a secondary plenum chamber located within said primary plenum chamber, said secondary plenum chamber having a bottom, at least one lateral wall, and a top, said bottom of said secondary plenum chamber being separated from said bottom of said primary plenum chamber by a first spaced distance, said shield extending over at least a portion of said top of said secondary plenum chamber, a secondary inlet passageway formed in an upper portion of said secondary plenum chamber, said secondary inlet passageway fluidly connecting said primary plenum chamber to said secondary plenum chamber;

a filter member covering said secondary inlet passageway, said filter member being adapted to prevent objects having at least a predetermined size from entering said secondary plenum chamber via said secondary inlet passageway;

an outlet passageway formed in said secondary plenum chamber, said outlet passageway fluidly connecting said secondary plenum chamber to said ventilation system;

a primary drain passageway formed in a lower portion of said primary plenum chamber, at least a portion of said primary drain passageway being lower than said bottom of said secondary plenum chamber; and a secondary drain passageway formed in a lower portion of said secondary plenum chamber, said secondary drain passageway fluidly connecting said secondary plenum chamber to said primary plenum chamber.

16. An air intake manifold in accordance with claim 15, wherein said filter member is a screen.

17. An air intake manifold in accordance with claim 15, wherein said secondary inlet passageway is formed in said top of said secondary plenum chamber.

18. An air intake manifold in accordance with claim 17, wherein said shield is separated from said top of said secondary plenum chamber by a second spaced distance.

19. An air intake manifold in accordance with claim 15, wherein said secondary inlet passageway is formed in said top and at least one lateral wall of said secondary plenum chamber where said top of said secondary plenum chamber intersects with one of said at least one lateral wall of said secondary plenum chamber.

20. An air intake manifold in accordance with claim 19, wherein said shield is separated from said top of said secondary plenum chamber by a second spaced distance.

21. An air intake manifold in accordance with claim 15, wherein said primary drain passageway is formed in one of said lateral walls of said primary plenum chamber.

22. An air intake manifold in accordance with claim 15, wherein said secondary drain passageway is formed in said bottom of said secondary plenum chamber.

23. An air intake manifold in accordance with claim 15, further comprising:

a flap attached to the exterior of said primary plenum chamber and covering said primary drain passageway.

24. An air intake manifold in accordance with claim 15, wherein said primary plenum chamber and said secondary plenum chamber share at least one common lateral wall.

25. An air intake manifold in accordance with claim 24, wherein said outlet passageway is formed in said at least one common lateral wall.

* * * * *